United States Patent [19]

Reinecke et al.

[11] 4,380,177

[45] Apr. 19, 1983

[54] GEAR SHIFT CONTROL MECHANISM FOR SERVO-DRIVEN TRANSMISSION

[75] Inventors: Erich Reinecke, Burgdorf; Alfred Klatt, Wathlingen, both of Fed. Rep. of Germany

[73] Assignee: WABCO Fahrzeugbremsen G.m.b.H., Hanover, Fed. Rep. of Germany

[21] Appl. No.: 223,524

[22] Filed: Jan. 8, 1981

[30] Foreign Application Priority Data

Mar. 1, 1980 [DE] Fed. Rep. of Germany ....... 3007953

[51] Int. Cl.³ .......................... G05G 5/04; F16H 57/06
[52] U.S. Cl. ......................................... 74/475; 74/364; 74/477; 74/526; 74/DIG. 7
[58] Field of Search ................. 74/364, 475, 477, 526, 74/540, DIG. 7

[56] References Cited

U.S. PATENT DOCUMENTS

| | | | |
|---|---|---|---|
| 3,111,040 | 11/1963 | Lapsley | 74/477 X |
| 3,159,043 | 12/1964 | Herrmann | 74/475 X |
| 3,214,998 | 11/1965 | Hall | 74/475 X |
| 3,795,153 | 3/1974 | Seilly | 74/477 X |
| 4,070,914 | 1/1978 | Reinhardt et al. | 74/475 |

*Primary Examiner*—Allan D. Herrmann
*Attorney, Agent, or Firm*—G. J. Falce

[57] ABSTRACT

A gear shift mechanism for providing a vehicle operator with a "feel" of a desired gear change being completed in a power operated gear unit. A drum disc connected to the gear shift lever is formed with a recess in which a locking pin of an actuator valve is engageable when the gear shift lever is operated to a shift position, thereby limiting further movement of the gear shift lever. A sensor device associated with the gear unit detects completion of the gear change and operates the actuator to retract the locking pin from the recess to allow further movement of the gear shift lever, as an indication to the vehicle operator that the intended gear change is completed, so that he may engage the clutch and apply gas.

6 Claims, 1 Drawing Figure

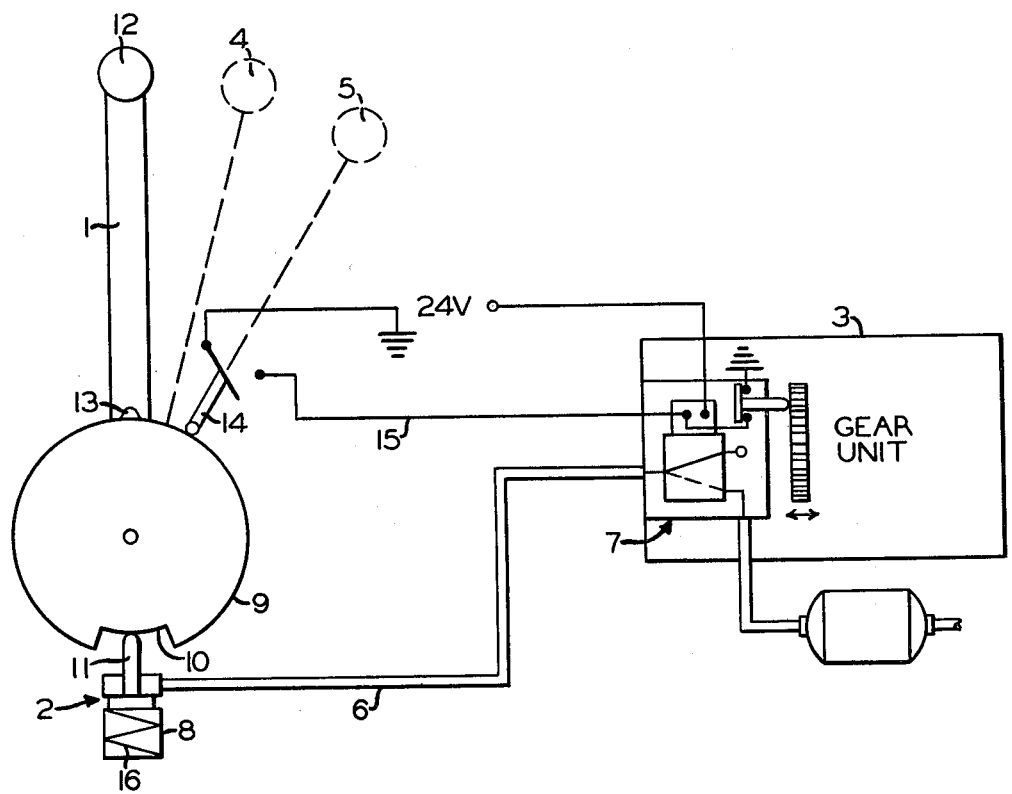

GEAR SHIFT CONTROL MECHANISM FOR SERVO-DRIVEN TRANSMISSION

BACKGROUND OF THE INVENTION

The present invention is related to driver selected gear units for adjusting a vehicle speed and power requirements and particularly to such gear units, which are operated by servo-drives.

In vehicles equipped with servo-driven gear units, the gear shift lever is not mechanically connected with the gear unit. Instead, the gear shift lever generally operates an intermediate valve device, which is connected to the gear unit by compressed air lines, for example, to operate a power cylinder to obtain the desired gear selection. In such an arrangement, however, the operator is unable to "feel" the shifting of gears, since there is no resistance to movement of the gear shift lever. It will be understood, of course, that the operator can only engage the clutch and apply gas when the gear change has been completed. Knowledge of the gear change completion can be obtained by means of a signal light on the vehicle dashboard or by an audible signal tone, but these solutions have the disadvantage of diverting the driver's attention from his traffic-related duties.

SUMMARY OF THE INVENTION

The object of the invention, therefore, is to provide a simple arrangement which permits the driver of a vehicle having a servo-driven gear unit to sense completion of the gear change through the gear shift lever.

This objective is attained, in accordance with the present invention, by providing an actuating cylinder having a locking pin that is normally engaged with a recess in the drum disc of the gear shift lever to limit movement of the gear shift lever from a first position to a second position, in accordance with the selected gear change. A gear change sensing device associated with the gear unit supplies a signal to the actuating cylinder to release the locking pin when the selected gear change has been completed. This allows the operator to continue movement of the gear shift lever beyond the second position to a third position, as an indication of the gear change completion without requiring the operator to monitor visual signaling devices or the like. The fact that the driver must actuate the gear shift lever to initiate the selected gear change makes the sensing arrangement through the gear shift lever simply an extension of the gear shift operation.

BRIEF DESCRIPTION OF THE DRAWING

This and other objects of the invention will be apparent from the following more detailed explanation when taken with the accompanying drawing showing the invention in schematic form.

DESCRIPTION AND OPERATION

The arrangement consists of a gear shift lever 1 and a locking mechanism 2. As mentioned in the "BACKGROUND OF THE INVENTION", the gear shift lever is connected to a gear unit 3 by a remote drive (not shown), other than by a direct mechanical link, as for example, by a valve device connected by air lines to a power cylinder that is arranged to make the desired gear change within gear unit 3. A pneumatic conduit 6 connects a sensing device 7 to the operating chamber of a pneumatic actuator 8. This sensing device 7 may be a conventional solenoid valve which is activated upon completion of the gear change to connect a source of compressed air to conduit 6, as a means of detecting the gear change. A drum disc 9 having a recess 10 along its periphery is connected to gear shift lever 1 for rotation therewith. Pneumatic actuator 8 includes a locking pin 11 that is normally extended by a spring 16 toward engagement with drum disc 9 and is retracted in response to pressurization of conduit 6.

From a neutral or idling position 12, gear shift lever 1 is moved by the driver in the direction of position 5 when a change in the gearing of gear drive unit 3 is desired. Initially, however, movement toward position 5 is stopped in an intermediate position 4 in which recess 10 is rotated into alignment with locking pin 11, which is spring loaded to engage the recess and prevent further rotation of drum disc 9. In this intermediate position 4 of gear shift lever 1, the aforementioned remote drive is effective to change the gearing within gear unit 3. When the selected gear change is made, it is detected by sensing device 7, which connects a source of compressed air to actuator 8 to withdraw locking pin 11 from recess 10 of drum disc 9. During the gear shifting operation, the driver maintains hand pressure on gear shift lever 1 in the direction of position 5, so that upon retraction of locking pin 11, the gear shift lever is moved from position 4 to position 5. This somewhat delayed further movement of the gear shift lever provides an indication to the driver that the gear change has been completed, and that he may therefore engage the clutch and apply gas. Since the driver uses his hand normally to shift gears, this method of sensing completion of the gear change by a "feel" transmitted through the gear shift lever is simply an extension of the gear shift operation and requires no other operation, such as reading gages or detecting indicator lights, which detracts from normal traffic-related duties.

When the gear shift lever is moved back to the neutral position 12, the gear engagement selected becomes disengaged and is detected by sensing device 7, which de-pressurizes conduit 6 to allow spring 16 of actuator 8 to extend locking pin 11 toward engagement with drum disc 9 preparatory to a further cycle of operation.

In another form of the invention, a cam 13 is provided on drum disc 9 to engage a normally open switch 14 in position 5 of gear shift lever 1. When switch 14 is closed, an electrical signal is connected to sensing device 7 via a wire 15 to deactivate the sensing device and accordingly de-pressurize conduit 6. This ensures that, even with fast shifting of gears, pin 11 can engage with recess 10 through the force of spring 16 of actuator 8.

As a further alternative, locking mechanism 2 can also be designed to employ a magnetic clutch in place of actuator 8, in which case, an electrical signal wire would replace conduit 6.

Having now described the invention what we claim as new and desire to secure by Letters Patent is:

1. A gear shift mechanism for indirectly shifting the gears in a gear unit via intermediate gear drive means comprising:
   (a) a manually operable gear shift lever having first, second, and third positions, said intermediate gear drive means being operative to effect a change of gearing of said gear unit in response to movement of said gear shift lever from said first position to said second position;
   (b) locking means manually engageable with said gear shift lever in said second position thereof for preventing movement of said gear shift lever to said third position; and (c) gear change sensing means for operating said locking means in response to completion of said gear change to accordingly effect disengagement of said locking means and thereby permit further movement of said gear shift lever from said second position to said third position, by which movement an operator of said gear shift lever is apprised of completion of said gear change.

2. A gear shift mechanism, as recited in claim 1, wherein said locking means comprises:

(a) a disc having a recess formed therein;

(b) said gear shift lever being connected to said disc to effect operation thereof during movement of said gear shift lever between said first, second, and third positions; and (c) a fluid pressure operated actuator having a locking pin that is spring biased into engagement with said recess in said second position of said gear shift lever to prevent said movement thereof to said third position.

3. A gear shift mechanism, as recited in claim 2, further comprising a signal line connected between said gear change sensing means and said actuator.

4. A gear shift mechanism, as recited in claim 3, further characterized in that said signal line is a conduit via which fluid pressure is conducted to said actuator to effect operation of said locking pin in opposition to said spring bias.

5. A gear shift mechanism, as recited in claim 4, further characterized in that said gear sensing means normally effects de-pressurization of said conduit and effects pressurization thereof only in response to said completion of said gear change, said pressurization of said conduit effecting disengagement of said locking pin from said recess to permit said movement of said gear shift lever to said third position.

6. A gear shift mechanism, as recited in claim 4, further comprising:

(a) said gear change sensing means being electrically operative to effect de-pressurization of said conduit;

(b) switch means having a closed position for connecting a source of electric power to said gear change sensing means to effect operation thereof; and (c) cam means for effecting closure of said switch means in said third position of said gear shift lever.

* * * * *